United States Patent
Ghandehari et al.

(10) Patent No.: US 12,555,361 B2
(45) Date of Patent: Feb. 17, 2026

(54) LAND PARCEL IMPROVEMENTS WITH MACHINE LEARNING IMAGE CLASSIFICATION

(71) Applicant: MEDICI LAND GOVERNANCE, Midvale, UT (US)

(72) Inventors: Mehran Ghandehari, Provo, UT (US); Josh Hanks, Sandy, UT (US); Levi Lewis, Draper, UT (US)

(73) Assignee: MEDICI LAND GOVERNANCE, Midvale, UT (US)

( * ) Notice: Subject to any disclaimer, the term of this patent is extended or adjusted under 35 U.S.C. 154(b) by 417 days.

(21) Appl. No.: 18/271,917

(22) PCT Filed: Jan. 17, 2022

(86) PCT No.: PCT/US2022/012659
§ 371 (c)(1),
(2) Date: Jul. 12, 2023

(87) PCT Pub. No.: WO2022/155563
PCT Pub. Date: Jul. 21, 2022

(65) Prior Publication Data
US 2024/0071054 A1 Feb. 29, 2024

Related U.S. Application Data

(60) Provisional application No. 63/137,833, filed on Jan. 15, 2021.

(51) Int. Cl.
| G06V 10/774 | (2022.01) |
| G06Q 50/16 | (2024.01) |
| G06V 10/764 | (2022.01) |
| G06V 10/82 | (2022.01) |
| G06V 20/10 | (2022.01) |

(52) U.S. Cl.
CPC ......... *G06V 10/774* (2022.01); *G06Q 50/165* (2013.01); *G06V 10/764* (2022.01); *G06V 10/82* (2022.01); *G06V 20/176* (2022.01)

(58) Field of Classification Search
CPC .... G06V 10/774; G06V 10/764; G06V 10/82; G06V 20/176; G06V 10/454; G06V 20/188; G06V 20/13; G06V 10/457; G06V 10/762; G06V 10/809; G06V 20/182; G06Q 50/165; G06Q 10/10; G06Q 30/0278; G06Q 40/10; G06Q 50/16; G06Q 50/02; G06N 3/045; G06N 3/0464; G06N 3/084; G06N 3/09; G06N 3/08; G06F 16/55; G06T 2207/20084; G06T 2207/20081; G06T 7/11; G06T 2207/10032; G06T 2207/30184; G06T 2207/30188
See application file for complete search history.

(56) References Cited

U.S. PATENT DOCUMENTS

| 10,528,812 | B1 | 1/2020 | Brouard et al. | |
| 10,915,798 | B1* | 2/2021 | Zhang | G06V 20/00 |
| 10,922,589 | B2* | 2/2021 | Sargent | G06F 18/254 |
| 10,949,703 | B2* | 3/2021 | Shao | G06V 10/764 |
| 11,030,747 | B1* | 6/2021 | Feng | G06T 7/174 |
| 11,200,458 | B1* | 12/2021 | Krishnamoorthy | G06N 3/045 |
| 11,270,397 | B2* | 3/2022 | Yang | G06N 20/00 |
| 11,544,832 | B2* | 1/2023 | Lowe | G06T 7/0002 |
| 11,704,576 | B1* | 7/2023 | McEntire | G06F 16/29 |
| | | | | 706/12 |
| 11,704,581 | B1* | 7/2023 | McEntire | G06N 5/04 |
| | | | | 706/11 |
| 11,861,497 | B2* | 1/2024 | Levinshtein | G06T 1/20 |
| 2005/0047663 | A1* | 3/2005 | Keenan | G06V 20/13 |
| | | | | 382/254 |
| 2007/0226004 | A1 | 9/2007 | Harrison | |
| 2009/0234782 | A1* | 9/2009 | Apte | G06N 20/00 |
| | | | | 706/45 |
| 2016/0117587 | A1* | 4/2016 | Yan | G06N 3/0464 |
| | | | | 706/20 |
| 2017/0076438 | A1* | 3/2017 | Kottenstette | H04N 23/10 |
| 2017/0140245 | A1* | 5/2017 | Kraft | G06F 18/214 |
| 2017/0287170 | A1* | 10/2017 | Perona | G06V 20/56 |
| 2019/0066137 | A1* | 2/2019 | Weissbourd | G06Q 30/0205 |
| 2019/0228224 | A1* | 7/2019 | Guo | G06N 3/09 |
| 2019/0228225 | A1* | 7/2019 | Guo | G06Q 50/02 |
| 2019/0385021 | A1* | 12/2019 | Sasaki | G06N 3/045 |
| 2020/0026953 | A1* | 1/2020 | Shao | G06V 10/82 |
| 2020/0090516 | A1 | 3/2020 | Sert | |
| 2020/0193157 | A1* | 6/2020 | Soni | G06F 18/2163 |
| 2021/0158094 | A1* | 5/2021 | Ji | G06F 18/2148 |

(Continued)

OTHER PUBLICATIONS

International Preliminary Report on Patentability (Chapter 1 of the Patent Cooperation Treaty) issued in International Application No. PCT/US2022/012659, mailed Jul. 27, 2023.

(Continued)

*Primary Examiner* — Michael S Osinski
(74) *Attorney, Agent, or Firm* — Charles C. Achkar; Amster Rothstein & Ebenstein LLP

(57) ABSTRACT

A method for identification of land improvements in a given parcel of land that includes generating a first training data set by clipping a large image of a parcel of land into individual parcel images each including images of improvements, and each improvement being labeled with an improvement type, providing the individual parcel images to a first classification model, training the first classification model based on the individual parcel images to identify unlabeled improvements in a parcel image and to obtain a multi-label classifier, generating a second training data set of images, and training a second, semantic segmentation model based on the second training data set.

15 Claims, No Drawings

(56) References Cited

U.S. PATENT DOCUMENTS

2021/0183045 A1* 6/2021 Iwasawa ............... G06V 10/764
2021/0217117 A1* 7/2021 Yang ...................... G06N 20/00
2021/0383534 A1* 12/2021 Tadross ................. G06V 10/82
2024/0005533 A1* 1/2024 Veeravasarapu ..... G06N 3/0464

OTHER PUBLICATIONS

International Search Report issued in International Application No. PCT/US2022/012659, mailed Apr. 18, 2022.
Written Opinion of the International Searching Authority issued in International Application No. PCT/US2022/012659, mailed Apr. 18, 2022.

* cited by examiner

LAND PARCEL IMPROVEMENTS WITH MACHINE LEARNING IMAGE CLASSIFICATION

CROSS REFERENCE TO RELATED APPLICATIONS

The present application is a § 371 National Phase application based on PCT/US2022/012659, filed Jan. 17, 2022, which claims the benefit of Provisional application No. 63/137,833, filed Jan. 15, 2021 the subject matter of each of which is incorporated by reference in their entirety.

FIELD OF INVENTION

The present invention relates to automatic valuation of real estate (a parcel of land having improvements thereon) with a computer-implemented method that detects human-made land improvements in the parcel of land.

BACKGROUND

A human-made land improvement as used herein refers to a human-made structure such as a single or a multi-family building, a garage, a car port, a swimming pool, a barn, a shed or any other human-made structure that may affect the value of a parcel of land compared to an undeveloped parcel of land.

Computer-implemented object recognition (sometimes referred to as computer vision) can allow for identifying multiple objects in a digital photograph.

Recognition of multiple objects in a digital photograph may involve image classification and object localization, which together can be employed in the detection and recognition of different objects in a digital image.

Image classification permits predicting the class of one object in an image.

Object localization permits identifying the location of objects in an image and drawing a boundary (for example, a box) around each object.

Relatively recently, neural network models have been proposed that can be trained to perform image classification and segmentation in a digital photograph.

A convolutional neural network (CNN) can be trained, for example, to classify an object in a digital photograph (i.e. determine what the object is), determine the location of the object in the digital image, and perform image segmentation, which involves separating areas within the image (for example, separating a road and a house in the image).

There are many known CNNs.

U-Net is a convolutional neural network developed originally for biomedical image segmentation such as brain and liver image segmentation. In U-Net, low-level feature maps are combined with higher-level ones for precise localization. Image segmentation using U-Net is employed in many fields from self-driving cars to remote sensing. For example, it is commonly used to classify satellite imagery and to partition the image into different land uses.

Region Based Convolutional Neural Networks (R-CNN) are, for example, models for computer-implemented object detection in digital images. A R-CNN can, from an input image, produce a set of bounding boxes as output, each bounding box containing an object and a respective category of the object.

A R-CNN can be configured to perform other tasks. For example, A R-CNN can extract regions of interest (ROI), which can be fed to a neural network to determine the object(s) contained within the regions ROI.

Another model called Mesh R-CNN can generate a 3D mesh from a 2D image.

SUMMARY OF THE DISCLOSED INVENTION

To assess taxes on real estate, the value of the real estate is usually needed.

Land valuation requires knowing the human-made land improvements, which is traditionally determined by visiting the parcel of land. This method, while accurate, is costly and time-consuming.

It is an object of the present invention to train a neural network to perform image recognition of the human-made land improvements in a digital aerial image of a parcel of land.

It is another object of the invention to use the trained neural network to classify the human-made land improvements in a digital image.

It is a further object of the present invention to produce automatically, from the classified human-made land improvements (i.e., the output of the trained CNN), a report that includes a list of the human-made land improvements in the parcel of land.

It is yet another object of the present invention to automatically valuate, from the classified human-made land improvements (i.e. the output of the trained CNN), the real estate (i.e. the parcel of land and the classified human-made land improvements thereon) and automatically generate a report that provides the details of the valuation, including, for example, an aerial or satellite image of the parcel of land in which each human-made land improvement is identified (for example, with a box drawn around each classified human-made land improvement), the respective value of each classified human-made land improvement, and the value of the parcel of land.

To train the neural network, a comprehensive training dataset having sample digital images (photographs) for each class of human-made land improvement maybe provided to a neural network.

Because local architecture varies from region to region, in one preferred embodiment, the input images may be from the same region. Thus, a CNN may be trained, not based on training data that includes all possible human-made land improvements, but based on the training data from the human-made land improvements found in a given type of community. For example, the training data may be based on structures one would encounter in a rural locality, and may not include data from sub urban or urban localities.

In one embodiment, the digital photographs used for training will be from the same general locality. That is, for example, if the CNN is being trained for valuation of real estate assets in a specific county or a specific state, the photographs will be from that county or state.

Preferably, the training will be a supervised training, which means that the images provided as input will be labeled to indicate the class of an object (i.e. the human-made land improvement) in the image. For example, digital aerial or satellite photographs of barns will be labeled barn to train the CNN to classify barns from aerial or digital photographs.

Once the CNN is trained, then an aerial digital photograph or a digital satellite photograph of a parcel of land is fed to the trained CNN as the input. The trained CNN would then classify each human-made land improvement in the digital photograph of the parcel of land, and locate each classified human-made land improvement within the photograph. This may be the output of the trained CNN.

The output of the CNN may be then fed to a valuation system that will generate valuation reports.

From the classified human-made land improvements in the output of the trained CNN, for example, the valuation system will produce automatically a report that includes a list of the human-made land improvements in the parcel of land.

From the classified human-made land improvements in the output of the trained CNN, for example, the valuation system will automatically prepare a real estate valuation report which may include the value of the parcel of land as well as the human-made land improvements thereon.

The report produced by the valuation system may, for example, include an aerial or satellite image of the parcel of land in which each classified human-made land improvement is identified (for example, with a box drawn around each classified human-made land improvement), the respective value of each classified human-made land improvement, and the value of the parcel of land.

A CNN trained according to the present invention would be able to detect several building types in a parcel of land, which can significantly reduce the cost and increase the efficiency of valuation and tax role creation. Also, the proposed approach can easily scale up to identify the improvement type for very large geographic areas in a short amount of time.

DETAILED DESCRIPTION

The methods described are intended to be implemented with a computer or a plurality of computers (as necessary) resulting in a computer system that is trained to perform a method as described herein.

To implement a method to detect human-made improvements on a parcel of land, a CNN may be trained with digital aerial or satellite photographs. A CNN is preferred because it does not suffer from translation invariance and thus can extract features from training digital photos regardless of the orientation of the subject appearing in the photos.

The training photographs may be resized, and "cleaned" with an appropriate filter prior to submission to the CNN.

Below is a detailed explanation of a method according to the present invention.

Initially, a model is trained to perform multi-label classification for identifying improvement types in a parcel. To start the training process, two different datasets are needed. The two different datasets will include a high-resolution RGB image as the raster dataset (e.g., Geotif) and a parcel dataset as the vector data (e.g., Shapefile or GeoJson). The high-resolution image (30 cm resolution or finer) can be obtained by a satellite, an airplane, or a drone. The parcel boundaries are usually available as vector data, but they can be automatically extracted using semantic segmentation, for example, when a boundary demarcation such as a fence can be seen in the image.

The first step in creating a training dataset is clipping out the image for each parcel from the parcel data. Each clipped (individual) parcel image would correspond to a parcel with improvements such as a building, a garage, a barn etc. Each individual clipped image will then be labeled based on the available improvements in the parcel. For example, one parcel can be labeled to have a "Semi-Detached house, Servants Quarter, Swimming Pool, Garage", each label being associated with, and identifying, a type of improvement in the clipped parcel image. Therefore, for each clipped parcel image, one or more labels would be recorded and these labels will be saved in a csv file with the corresponding parcel clipped image name.

The training dataset will include sample images from the area of interest, and should be large enough to include all of the possible improvement types in the area of interest to have a comprehensive and reliable classification training model. The training data set (the clipped parcel images) and the csv file are then imported and saved into a databunch that can be digested by the machine learning models. The clipped parcel images are resized to 256 by 256 pixels to obtain the same size for all of the images. The input dataset images (clipped parcel images that are labeled) may be subjected to image augmentation by rotation, flipping, shifting, etc. to increase the diversity of the images that can lead to the improvement in the performance of the model. Also, the input dataset may be normalized based on commonly used statistics (usually have a zero mean and unit variance) obtained, for example, from ImageNet. A minimum of twenty (20) percent of the input dataset images provided to the training model is randomly selected to be used for validation.

The next step is to create a multi-label classifier that associates target labels with improvements in each individual (clipped) input parcel image. A convolutional neural network with a Resnet34 may be used as a pre-trained neural network architecture that has been trained to identify various categories of improvements. A binary cross-entropy may be used as a loss function and accuracy and f score is used as the metrics of the training model to generate and quantify accuracy from confusion matrix.

Next, the model is trained in two steps. First, the last layer of ImageNet is replaced with a new layer based on the current classification problem and the weights are optimized in this layer without any changes in the other layers. After that, the entire model is unfreezed and all of the weights are changed to find the best model in a back-propagation process. Based on the performance of the model, some of the hyper parameters such as learning rate, batch size, epochs, and augmentation parameters are changed to improve the model performance.

The trained model can be now used to determine the improvement type in an image of a parcel with improvements that are not labeled.

After identifying the improvement types, the geometry of each improvement needs to be determined. A semantic segmentation process (discussed below) for building footprint extraction may be employed for this purpose. First, there is a need for a training dataset. The training dataset can be obtained by manually digitizing the images or downloading building footprints from, for example, Open Street Map (if available) for the area of interest. The training dataset will include the RGB tiled (256 by 256 pixels) images and the corresponding binary images identifying building and non-building pixels. Similar to the process of image classification discussed herein, the training dataset is subject to a preprocessing step, which may include normalization, and data augmentation. A U-net segmentation model with an ImageNet pre-trained resnet34 encoder is suitable for training a model for identifying buildings. The loss function may be a combination of Dice (also called Jaccard) loss and a Binary Cross Entropy function. Some other techniques such as Pixel shuffle upsampling with ICNR initiation, leaky ReLU, AdamW optimizer, and one cycle learning schedule may also be used to improve the performance of the model. Model performance may be quantified using F1-Score based on the intersection over the union of two building footprints with a threshold of 0.5. The trained model may be then used to predict building pixels and then the raster is converted to vector polygons and the generated polygons are regularized to eliminate jagged lines generated in the vectorization process. Also, morphology operations (e.g., dilation/erosion) may be used to remove holes and objects smaller than a given threshold. A similar process may be used to train a model for extracting swimming pools. As a result of the semantic segmentations, all of the individual improvements in a parcel are identified as polygon geometries.

The next step is to associate an improvement type identified in the segmentation process with each individual building (or swimming pool) in each parcel image parcel. The improvement type can be based on the size and the height (obtained from terrain data) of the improvement or another classification algorithm. As a result of this process, a report including the improvements in a parcel, and their corresponding area and type may be generated, based on which the value of each parcel can be easily assessed according to a given assessment formula.

In summary, the method disclosed herein is based in two computer-implemented training models. First a training data set is generated by clipping a large image into individual parcel images in order to train the first classification model. The first model is used to identify all of the improvements in a given parcel image. Then, a second training data set is generated to train the second, semantic segmentation model. The second training data set may be simply 256×256-pixel images that identify building, non-building pixels etc. The second model identifies the geometry of all improvements in each parcel image. Finally, the previously-identified improvement types are associated with individual geometries (improvements) in a given parcel image based on the size and the height of improvements.

After training, the trained model can be used to determine the improvement types in all available parcels in the area of interest. To do this, an image of a parcel of land with improvements is fed to the trained model for identification and classification of the improvements.

What is claimed is:

1. A method for identification of land improvements in a given parcel of land, comprising:
   generating a first training dataset by clipping a large image of a parcel of land into individual parcel images each including images of improvements, and each improvement being labeled with an improvement type;
   providing the individual parcel images to a first classification model;
   training the first classification model based on the individual parcel images to identify unlabeled improvements in a parcel image and to obtain a multi-label classifier;
   generating a second training dataset of images; and
   training a second semantic segmentation model based on the second training dataset.

2. The method of claim 1, wherein the second training dataset includes 256×256-pixel images that identify building and non-building pixels.

3. The method of claim 1, wherein the second model identifies the geometry of all improvements in each parcel image.

4. The method of claim 1, further comprising associating improvement types with individual geometries based on improvement size and improvement height.

5. The method of claim 1, wherein the model is a convolutional neural network.

6. The method of claim 1, wherein an improvement type may be a building, a garage, a barn, servant's quarters, or a pool.

7. The method of claim 1, further comprising resizing of the clipped, individual parcel images to have a same size.

8. The method of claim 1, further comprising augmenting the clipped, individual parcel images.

9. The method of claim 8, wherein the augmenting includes rotating, flipping, or shifting of the clipped, individual parcel images.

10. The method of claim 1, further comprising normalizing the first training dataset.

11. The method of claim 1, wherein the first training dataset includes images from a same geographic area.

12. The method of claim 1, further comprising using a binary cross-entropy as a loss function in the training.

13. The method of claim 1, further comprising augmenting the images of the second training dataset of images.

14. The method of claim 13, wherein the augmenting includes rotating, flipping, or shifting of the images of the second training dataset of images.

15. The method of claim 1, further comprising normalizing images of the second training dataset of images.

* * * * *